United States Patent
Hagen et al.

(10) Patent No.: US 7,247,796 B2
(45) Date of Patent: Jul. 24, 2007

(54) FILLING MATERIALS

(75) Inventors: Nathan K. Hagen, Austin, TX (US); David R. Hague, Austin, TX (US); Chad D. Mistele, Alexandria, MN (US); Mark E. Napierala, St. Paul, MN (US); Mario A. Perez, Burnsville, MN (US); Bhaskar V. Velamakanni, Woodbury, MN (US); James K. Young, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 304 days.

(21) Appl. No.: 11/015,047

(22) Filed: Dec. 17, 2004

(65) Prior Publication Data

US 2005/0137290 A1 Jun. 23, 2005

Related U.S. Application Data

(63) Continuation-in-part of application No. 10/695,543, filed on Oct. 28, 2003, now abandoned.

(60) Provisional application No. 60/539,521, filed on Jan. 27, 2004.

(51) Int. Cl.
 *H01B 7/00* (2006.01)
(52) U.S. Cl. ............................. 174/110 R; 174/113 C
(58) Field of Classification Search ............... 174/36, 174/110 R, 110 AR, 110 SR, 113 R, 120 R, 174/120 C, 120 AR, 120 SR
See application file for complete search history.

(56) References Cited

U.S. PATENT DOCUMENTS

| 3,683,104 A | 8/1972 | Woodland et al. |
| 3,843,568 A | 10/1974 | Woodland et al. |
| 3,879,575 A | 4/1975 | Dobbin et al. |
| 4,176,240 A | 11/1979 | Sabia |
| 4,324,453 A * | 4/1982 | Patel ........................... 385/100 |

(Continued)

FOREIGN PATENT DOCUMENTS

| EP | 0 067 009 A1 | 12/1982 |
| EP | 0 299 718 A2 | 1/1989 |
| EP | 0 889 343 A2 | 1/1999 |
| EP | 1 197 971 A1 | 4/2002 |
| WO | WO 93/05113 | 3/1993 |
| WO | WO 01/74480 A1 | 10/2001 |

OTHER PUBLICATIONS

Encylopedia of Polymer Science and Engineering, Wiley-Interscience Publication, John Wiley & Sons, 1987, vol. 7, p. 57.

(Continued)

*Primary Examiner*—William H. Mayo, III
(74) *Attorney, Agent, or Firm*—John A. Burtis

(57) ABSTRACT

The present invention relates to a filler material useful for communication cables, such as electrical cables and optical cables. In one embodiment, (a) from about 50 to 95 percent by weight mineral oil; (b) less than about 10 percent by weight block copolymer selected from the group consisting of styrene-ethylene/butylene, styrene-ethylene/propylene, styrene-butadiene-styrene, styrene-isoprene-styrene, styrene-ethylene/butylene-styrene, styrene-ethylene/propylene-styrene, and combinations thereof; (c) less than about 35 percent by weight petroleum wax; (d) less than about 20 percent by weight hollow glass microspheres; and (e) less than about 10 percent by weight thixotropic agent selected from the group consisting of clay, colloidal metal oxide, fumed metal oxide, and combinations thereof.

23 Claims, 1 Drawing Sheet

U.S. PATENT DOCUMENTS

| | | | |
|---|---|---|---|
| 4,333,706 A | 6/1982 | Davis et al. | |
| 4,351,913 A | 9/1982 | Patel | |
| 4,464,013 A | 8/1984 | Sabia | |
| 4,497,538 A | 2/1985 | Patel | |
| 4,509,821 A | 4/1985 | Stenger | |
| 4,617,422 A | 10/1986 | Hagger | |
| 4,639,483 A | 1/1987 | Billigmeier et al. | |
| 4,701,016 A | 10/1987 | Gartside, III et al. | |
| 4,703,997 A * | 11/1987 | Ijiri et al. | 385/109 |
| 4,709,982 A * | 12/1987 | Corne et al. | 385/100 |
| 4,756,851 A * | 7/1988 | Billigmeier et al. | 252/572 |
| 4,757,100 A | 7/1988 | Wichelhaus et al. | |
| 4,766,166 A * | 8/1988 | Upadhyaya et al. | 524/275 |
| 4,798,853 A | 1/1989 | Handlin, Jr. | |
| 5,169,716 A * | 12/1992 | Croft et al. | 428/379 |
| 5,187,763 A | 2/1993 | Tu | |
| 5,262,468 A | 11/1993 | Chen | |
| 5,358,664 A * | 10/1994 | Brauer | 516/109 |
| 5,418,272 A * | 5/1995 | Kawabata et al. | 524/436 |
| 5,562,985 A * | 10/1996 | Sano et al. | 428/375 |
| 5,657,410 A | 8/1997 | Fehn et al. | |
| 6,228,495 B1 * | 5/2001 | Lupia et al. | 428/379 |
| 6,310,163 B1 * | 10/2001 | Brookhart et al. | 526/318.6 |
| 6,374,023 B1 | 4/2002 | Parris | |
| 6,421,169 B1 * | 7/2002 | Bonnedal et al. | 359/337.1 |
| 6,534,572 B1 * | 3/2003 | Ahmed et al. | 524/275 |
| 6,816,655 B2 * | 11/2004 | Reyes-Gavilan et al. | 385/100 |
| 2003/0142932 A1 * | 7/2003 | Reyes-Gavilan et al. | 385/100 |
| 2003/0236387 A1 * | 12/2003 | Pavlin | 528/272 |
| 2004/0063812 A1 * | 4/2004 | Sohal | 523/200 |
| 2004/0157994 A1 * | 8/2004 | Kubo et al. | 525/88 |

OTHER PUBLICATIONS

American National Standard, American Society for Testing and Materials, West Conshohocken, PA, Designation: D 127-87, pp. 1-2. Jan. 1999.

American National Standard, ASTM International, West Conshohocken, PA, Designation: D 150-98. Mar. 1999.

American National Standard, ASTM International, West Conshohocken, PA, Designation: D 257-99, pp. 1-18. Oct. 1999.

American National Standard, ASTM International, West Conshohocken, PA, Designation: D 2501-91, pp. 1-3. Mar. 2000.

American National Standard, ASTM International, West Conshohocken, PA, Designation: D 3236-88, pp. 1-8. Dec. 1999.

"Product Description", Crompton, [available on the internet Oct. 28, 2003], [retrieved from the Internet on Jan. 27, 2004], http://www.cromptoncorp.com, 1 page.

"Product Description", KRATON, [available on the internet Oct. 28, 2003], [retrieved from the Internet on Jan. 27, 2004], http://www.kraton.com, pp. 1-2.

An Introduction to Kraton® Polymers, Issue 3, Kraton Polymers U.S. LLC, Houston, TX, Aug. 2003. pp. 1-19.

* cited by examiner

FILLING MATERIALS

CROSS REFERENCE TO RELATED APPLICATIONS

This application is a continuation-in-part of U.S. application Ser. No. 10/695,543, filed on Oct. 28, 2003 now abandoned and U.S. Application No. 60/539,521 filed on Jan. 27, 2004.

FIELD OF THE INVENTION

The present invention relates to filling materials for use in communication cables, such as electrical and optical cables. In particular, the filling material exhibits a low dielectric constant and can be processed at elevated temperatures.

BACKGROUND

Many communication cables are now buried into the ground. In such applications, the communication cable needs to withstand water penetration into the cable because water can severely affect the performance of the cable. For example, in an electrical cable, water destroys the capacitance balance of the electrical conductor. In an optical cable, water can negatively affect the integrity of the optical cable.

One solution devised by those skilled in the art to minimize water penetration into the cable involves pressurizing the interior of the cable with dry air. While the pressurized dry air cable may be useful in stopping water migration into the cable, it proves to be expensive to maintain and is not a widely accepted solution for cables buried under ground.

Another, more widely practiced solution involves filing the interior interstitial space of a cable with a water insoluble filling material, such as a sealant, that would plug the cable and stop the migration of water. When a filling material is used, several factors are usually taken into consideration, such as, e.g., its dielectric constant, density, aging and temperature stability, hydrophobic nature of the composition, processing and handling characteristics, shrinkage of the filling material upon cooling, toxicity, and cost.

While the foregoing technology may be useful, there exists a need for different filling materials with lower dielectric constants while taking into consideration the factors listed in the preceding paragraph.

SUMMARY

Disclosed herein are filler materials that can be used in electrical or optical systems such as electrical or optical cables. In one exemplary embodiment, the filler material comprises (a) from about 50 to 95 percent by weight mineral oil; (b) less than about 10 percent by weight block copolymer selected from the group consisting of styrene-ethylene/butylene, styrene-ethylene/propylene, styrene-butadiene-styrene, styrene-isoprene-styrene, styrene-ethylene/butylene-styrene, styrene-ethylene/propylene-styrene, and combinations thereof; (c) less than about 25 percent by weight petroleum wax; (d) less than about 20 percent by weight hollow glass microspheres; and (e) less than about 10 percent by weight thixotropic agent selected from the group consisting of clay, colloidal metal oxide, fumed metal oxide, and combinations thereof. In another exemplary embodiment, surface modified fumed metal oxide, in particular, surface modified fumed silica is used. In this document, the term "about" is presumed to modify all numerical values.

In another exemplary embodiment, the filler material comprises (a) from about 70.0 to 75.0 percent by weight mineral oil; (b) about 2.5 percent by weight styrene-ethylene/butylene-styrene block copolymer; (c) about 10.0 percent by weight petroleum wax; (d) from about 5.0 to 13.0 percent by weight hollow glass microsphere; (e) about 2.0 percent by weight surface modified fumed silica; and (f) about 0.2 percent by weight antioxidant or stabilizer.

As one skilled in the art readily knows, fumed silica is made by hydrolyzing silicon tetrachloride in vapor phase above 1000° C., giving very fine, nonporous, amorphous silica of high purity. See, e.g., *Encyclopedia of Polymer Science and Engineering,* Volume 7, John Wiley and Sons, 1987, p. 57. The term "surface modified fumed silica" means generally that the fumed silica has been altered either by chemical reactions or through other mechanisms. It is within the scope of the present invention for the fumed silica to be altered in situ, as during the manufacturing of the filler material as described below in detail.

One advantage of an exemplary embodiment of the present invention is that because the filler material has a low dielectric constant, that is a dielectric constant of less than or equal to 1.85, the thickness of the conductor insulation for an electrical cable can be reduced while maintaining the required mutual capacitance. With less insulation being used, the resulting cable would be smaller and weigh less. This advantage enables a lower cost electrical cable while not compromising its performance.

In the present invention, hollow glass microspheres help lower the dielectric constant of the filler material. The microspheres, however, can present a challenge. Because the density of the hollow glass microspheres is lower than the density of the other components used in the filler material, the hollow glass microspheres can phase separate, particularly at high temperature conditions. As used herein, the phrase "high temperature" is used to mean when the filler material is exposed to a temperature in excess of 90° C., typically around 110° C. One advantage of one embodiment of the present invention is that the filler material will not phase separate due to, among other factors, the use of a thixotropic agent such clay, colloidal metal oxide, fumed metal oxide, and combinations thereof.

When used in a cable, the filler material should have a sufficiently high melt drop temperature in order to prevent it from flowing out of the cable. An advantage of one embodiment of the present invention is that it exhibits high melt drop temperature. A high melt drop temperature is one that is typically above 90° C., as measured according to ASTM D-127. Another advantage of one embodiment of the present invention is that it exhibits low viscosity at high temperature conditions. A low viscosity is one that is less than 200 cP (0.2 Pa·s) at 110° C. and a shear rate of 40 sec$^{-1}$, as measured according to ASTM D-3236. A low viscosity filler material is desirable in that it allows for ease of handling and processing. For example, a filler material with low viscosity can more easily fill the interstitial space present in the cable. A low viscosity also allows the filler material to be processed at high temperature. The filler material of the present invention can but need not be cooled during the manufacture of the electrical cable. Yet another advantage of one embodiment of the present invention is that the filler material has a low density. A low density is one that is less than 0.8 g/cm$^3$ and in some applications can be less than 0.5 g/cm$^3$. The variation in the density depends on the content of the hollow glass microsphere. A low density filler material is desirable because when used in a cable, the filler material will not contribute as much weight to the cable thus yielding a lighter weight cable.

The filler material of the present invention can be used in various electrical, opto-electrical (i.e., a combination of optical and electronic components), and optical applications. Illustrative examples of such applications include cables, connectors, and closures. Illustrative connectors include, but are not limited to, discrete connectors, modular connectors, connector boxes and grease boxes. Illustrative closures include, but are not limited to drop wire closures, filled closures, buried closures, and terminal blocks.

The above summary of the present invention is not intended to describe each disclosed embodiment or every implementation of the present invention. The figure and the detailed description that follow more particularly exemplify illustrative embodiments.

BRIEF DESCRIPTION OF THE DRAWINGS

The present invention can be better described with reference to the following drawing, wherein.

The figures are not drawn to scale and are intended merely for illustrative purposes.

DETAILED DESCRIPTION

Figure 1:
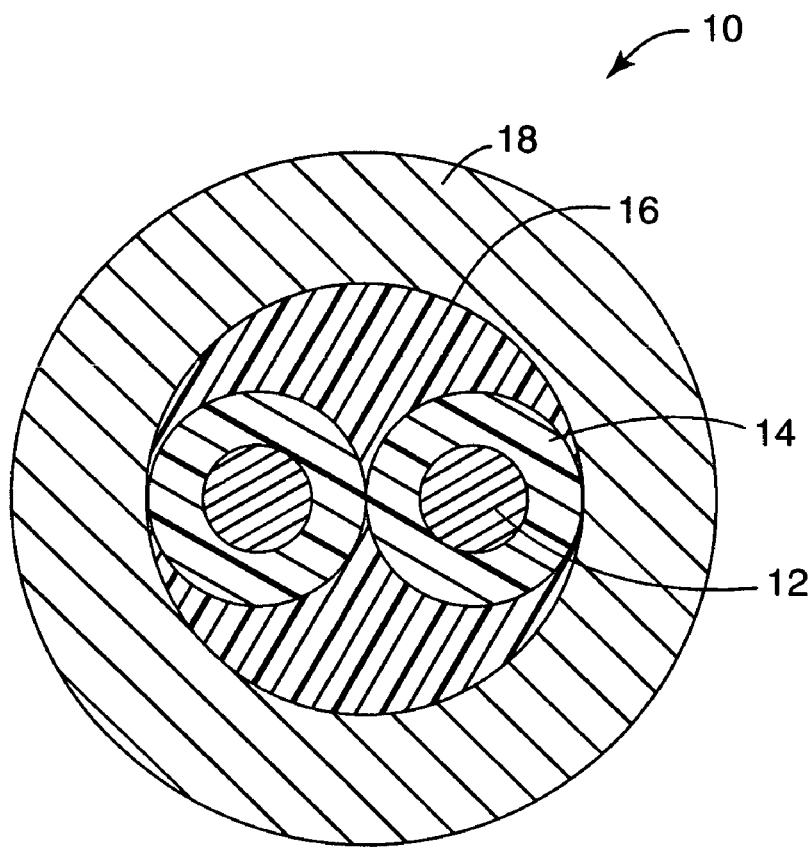
FIG. 1 is a schematic cross-sectional view of an exemplary electrical cable of the present invention.

FIG. 1 shows an exemplary electrical cable using the filler material of the present invention. Electrical cable 10 comprises two electrical conductors 12, such as copper wires, typically twisted together to form a pair. Surrounding each electrical conductor is polymeric insulator 14, such as polyethylene. Exterior cable structure 18 encloses the twisted pair of electrical conductors and filler material 16. Although FIG. 1 shows a pair of electrical conductors, one skilled in the art will understand that any number of electrical conductors can be used. The focus of the present invention lies in the filler material, which comprises or consists essentially of (i) mineral oil, (ii) block copolymer selected from the group consisting of diblock copolymer, triblock copolymer, and combinations thereof, (iii) petroleum wax, (iv) hollow glass microspheres, and (v) thixotropic agent. Optionally, antioxidants or stabilizers or functionalized polymers can be added to the filler material. The filler material can be described as having a bulk phase and a discontinuous phase. The bulk phase is present up to 50 volume percent of the total volume and includes mineral oil, block copolymer, petroleum wax, and thixotropic agent. The discontinuous phase is present up to 50 volume percent of the total volume and includes the hollow glass microspheres. Each of the components listed above is discussed in detail below. In the description below, all recited percent by weight are based on the total weight of the filler material.

Mineral oil is the largest constituent and is present at a minimum of 50% by weight. The mineral oil is present at a maximum of 95% by weight. The mineral oil can be either a paraffinic mineral oil or a naphthenic mineral oil. The mineral oil has less than 15% aromatic content. A naphthenic mineral is one that contains a naphthene group (more appropriately termed as a cycloparaffin) and is greater than 35% naphthenic and less than 65% paraffinic, according to ASTM D-2501. A suitable, commercially available mineral oil that can be used in the present invention is KAYDOL® White Mineral Oil from Crompton Corp., Middleburg, Conn. According to the Crompton web site at www.cromptoncorp.com, KAYDOL® White Mineral Oil is highly refined oil that consists of saturated aliphatic and alicyclic non-polar hydrocarbons, is hydrophobic, colorless, tasteless, odorless, and is chemically inert. Another useful commercially available mineral oil is SEMTOL®40 White Mineral Oil, also from Crompton Corporation.

The filler material contains block copolymer selected from the group consisting of diblock copolymer, triblock copolymer, and combinations thereof. The block copolymer is present at a maximum of 10% by weight. Suitable diblock copolymers include, but are not limited to, styrene-ethylene/butylene and styrene-ethylene/propylene. Suitable triblock copolymers include, but are not limited to, styrene-butadiene-styrene (SBS), styrene-isoprene-styrene (SIS), styrene-ethylene/butylene-styrene (SEBS), and styrene-ethylene/propylene-styrene (SEPS). Suitable, commercially available SEBS block copolymers that can be used in the present invention include KRATON™ G-1650 Block Copolymer and KRATON™ G-1652 Block Copolymer, both available from Kraton Polymers, Houston, Tex. According to the www.kraton.com web site, both polymers are linear SEBS block copolymers having a block styrene content of 30% in mass spectroscopy. The web site reported a solution viscosity of 8 Pa·s at 25% mass in toluene at 25° C. and a melt flow rate of less than 1 g/10 minute for KRATON™ G-1650 Block Copolymer. The web site reported a solution viscosity of 1.35 Pa·s at 25% mass in toluene at 25° C. and a melt flow rate of 5 g/10 minute for the KRATON™ G-1652 Block Copolymer. Another useful commercially available block copolymers is KRATON™ G-1726 Block Copolymer.

The filler material contains petroleum wax present at a maximum of 25% by weight. One function of the petroleum wax is to improve, i.e., to increase, the melt drop temperature of the filler material. The melting point of the petroleum wax is greater than 90° C. A suitable petroleum wax is a polyethylene wax having a melting point greater than 90° C. Suitable, commercially available petroleum wax that can be used in the present invention include PARAFLINT® C105 Paraffin Wax, which is reported to have a melting point of 97.8° C., and PARAFLINT® H1 Paraffin Wax, which is reported to have a melting point of 107.8° C. Both PARAFLINT® Paraffin Waxes listed above are considered to be synthetic wax made by the Fischer-Tropsch process and are available from Moore & Munger, Inc., Shelton, Conn.

The filler material contains hollow glass microspheres present at maximum of 20% by weight. Useful hollow glass microspheres have a particle size (by volume and at effective top size (95%)) of 10 to 140 micrometers and a true density of 0.1 g/cm$^3$ to 0.4 g/cm$^3$. Suitable, commercially available hollow glass microspheres that can be used in the present invention include the S Series, K Series, and A Series of 3M™ SCOTCHLITE™ Glass Bubbles from 3M Company, St. Paul, Minn. For example, the S22, K1, K15, K20 and A16 type hollow glass microspheres can be used and Table 1 below lists their true density and particle size. The term "true density" is a concentration of matter, as measured by mass (weight) per unit volume. It is within the scope of the present invention to use functionalized hollow glass microspheres.

TABLE 1

| Type | True Density (g/cm³) | Particle Size Distribution (microns, by volume) | | | Effective top size (95%) |
|---|---|---|---|---|---|
| | | 10th percent | 50th percent | 90th percent | |
| K1 | 0.125 | 30 | 65 | 115 | 120 |
| K15 | 0.15 | 30 | 60 | 105 | 115 |
| K20 | 0.20 | 25 | 55 | 95 | 120 |
| S22 | 0.22 | 20 | 35 | 65 | 75 |
| A16 | 0.16 | 35 | 70 | 115 | 135 |

Because the hollow glass microspheres used in the present invention contain a large volume fraction of air (e.g., on the order of 90% to 95% air) having a dielectric constant of 1.0, they function to reduce the overall dielectric constant of the filler material. Because the hollow glass microspheres have a low density, as compared to the rest of the filler material constituents, the microspheres tend to phase separate when the filler material is melted at processing temperatures. As one skilled in the art will readily recognize, phase separation of the hollow glass microspheres from the filler material when it is in a molten state presents processing challenges and will result in a non-uniform performing filler material. It has been learned that the use of a thixotropic agent can help to minimize if not eliminate the problem of phase separation of the hollow glass microspheres.

Sedimentation or flotation of particles (i.e., phase separation), such as hollow microspheres, can be described by the following equation known as Stokes' Law:

$$V_0 = [d^2(\rho_b - \rho_m)] \div (18\eta_m)$$

where "$V_0$" is the terminal float velocity of a single hollow sphere with diameter "d" and density "$\rho_b$" in a gravitational field, g, through a fluid medium of viscosity "$\eta_m$" and density "$\rho_m$". While Stokes' Law is used to predict stability against sedimentation or flotation of hollow spheres in dilute dispersions, the concept can be extended to the filler material of the present invention. Using Stokes' Law, the minimum fluid viscosity needed to keep the hollow sphere from phase separating can be estimated for a given hollow sphere diameter and density. The fluid viscosity of the filler material can be controlled through the use of thixotropic agent.

The filler contains thixotropoic agent present at a maximum of 10% by weight. Thixotropic agents that are useful in the present invention can be selected from the group consisting of clay, colloidal metal oxide, fumed metal oxide, and combinations thereof. Useful metal oxides, whether colloidal or fumed, include, but are not limited to silica, alumina, zirconia, and titania. A suitable thixotropic agent should produce a filler material having a shear viscosity vs. shear rate response similar to that shown in FIG. 2. That is, for a given temperature, the viscosity of the filler material at low shear rate is higher than the viscosity at a high shear rate. This type of interaction is desirable because at low shear rates, the viscosity should be sufficiently high to entrap the hollow glass microspheres in solution so that they will not phase separate and at high shear rate, the viscosity is sufficiently low so that the filler material solution can flow for processing purposes, e.g., the filler material can be pumped. As one skilled in the art will recognize, a constant stress rheometer (such as the Advanced Rheometer 2000 from TA Instruments, New Castle, Del.) can be used to measure continuously the viscosity as a function of shear rate of a filler material at a given temperature to generate the graph shown in FIG. 2.

Figure 2:
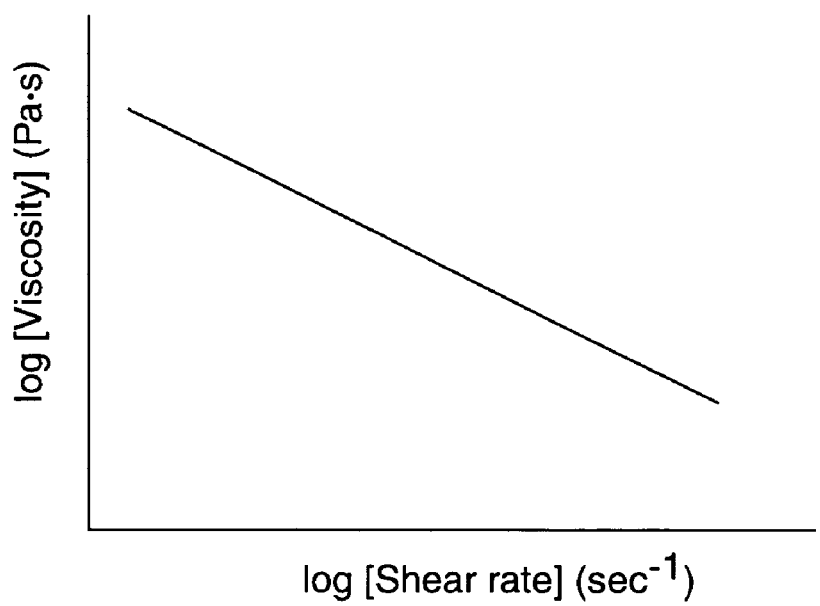
FIG. 2 is a graph showing the interaction between solution viscosity and shear rate for a generic thixotropic material.

The shear viscosity (V) versus shear rate response shown in FIG. 2 are related by the following equation, known as the Power Law Fluid:

$$V = k\, S^{-(n-1)}$$

where "k" is a constant and is an indicator of viscosity at 1 sec$^{-1}$, and "n" is known as the Power Law Index (PLI) and is an indicator of the effect of shear on viscosity. From the graph of FIG. 2, one can determine the effect of a particular thixotropic agent on the rheology, i.e., the flow properties of the filler material. If the shear viscosity (V) of a filler material is insensitive to shear rate (S), as in, for example a Newtonian fluid, the PLI is 1. A filler material whose viscosity decreases with shear is non-Newtonian and are known as "thixotropic." The PLI of thixotropic materials range from $0 < n < 1$.

In the present invention, in the filler material, as the amount of thixotropic agent increases, the "k" value of the filler material increases and the "n" value decreases. The minimum viscosity of the inventive filler material, as defined by the Power Law Fluid parameters, occurs at an "n" value of 0.8 and a "k" value of 0.25 Pa·s. The maximum viscosity of the inventive filler material, as defined by the Power Law Fluid parameters, occurs at an "n" value of 0.2 and a "k" value of 7.0 Pa·s. It should be noted that factors such as particle size, surface lyophilicity/lyophobicity, and concentration of particulate thixotropic fillers influence the viscosity ("k" value) and the extent of shear thinning ("n" value) of the filler material. In one embodiment, the thixotropic agent is a fumed metal oxide, such as fumed silica.

While different types of fumed silica will minimize phase separation of the hollow glass microspheres to different degree, it has been learned that surface treated fumed silica can be particularly useful in the present invention. Among other reasons, surface treated fumed silica is hygroscopic and it causes a faster drop in viscosity with shear compared to untreated fumed silica. Suitable, commercially available surface treated fumed silica that can be used in the present invention include CAB-O-SIL® TS-530 Treated Fumed Silica (a hexamethyldisilazane treated hydrophobic fumed silica), CAB-O-SIL® TS-610 Treated Fumed Silica (a dimethyldichlorosilane treated hydrophobic fumed silica), and CAB-O-SIL® TS-720 Treated Fumed Silica (a dimethyl silicone fluid treated hydrophobic fumed silica), from Cabot Corporation of Tuscola, Ill. Other suitable, commercially available surface treated fumed silica include AEROSIL® R-104 and R-106 Fumed Silica (octamethylcyclotetrasiloxane treated hydrophobic fumed silica), and AEROSIL® R-972 and R-974 Fumed Silica (dimethyldichlorosilane a treated hydrophobic fumed silica) from Degussa Corporation of Allendale, N.J. The fumed silicas listed above are substantially hydrophobic after surface treatment.

The filler material can optionally contain antioxidants or stabilizers at less than 1% by weight to improve processing or to protect against environmental aging caused by heat. Suitable antioxidants or stabilizers include phenols, phosphites, phosphorites, thiosynergists, amines, benzoates, and combinations thereof. Useful, commercially available phenolic-based antioxidants include IRGANOX® 1035, IRGANOX® 1010, IRGANOX® 1076 Antioxidant and Heat Stabilizer for wire and cable applications, from Ciba Specialty Chemicals Corp., Tarrytown, N.Y.

In one embodiment, the filler material exhibits the following functional properties. At 1 megahertz, it has a dielectric constant of less than 2.0 and a dissipation factor of less than 0.001, both as measures according to ASTM D-150. In another embodiment, the filler material has a dielectric constant of less than 1.85 at 1 megahertz. In yet another embodiment, the filler material has a dielectric constant of less than 1.65 at 1 megahertz. It has a volume resistivity at 500 volts of greater than $10^{13}$ ohm-cm, as measured according to ASTM D-257. It has a melt drop point of greater than 90° C. as measured according to ASTM D-127. The filler material has a maximum solution viscosity of 200 cP (0.2 Pa·s) at 110° C. and a shear rate of 40 sec$^{-1}$. In another embodiment, the filler has a solution viscosity of 75 cP (0.075 Pa·s) at 110° C. and a shear rate of 40 sec$^{-1}$. The solution viscosity can be measured according to ASTM D-3236 using a Brookfield RVT Thermocel viscometer with a SC 4-27 spindle and a rotational speed of 100 rpm.

The filler material can be made using the following exemplary process. The mineral oil, block copolymer, and petroleum wax are mixed in a vessel heated to at least 110° C. until the components are substantially dispersed. While maintaining the solution temperature of 110° C., the thixotropic agent is added and homogenized until it is substantially dispersed in the solution. To remove air bubbles that may have been entrapped during the homogenization, the solution is placed in a vacuum oven heated to between 110° to 120° C. A vacuum of 30 inches Hg (102 kPa) is used. Thereafter, hollow glass microspheres are added to the solution while its temperature is maintained at 110° C.

It has been found that the inventive filler material can be maintained in solution form at a temperature of at least 110° C., for at least 1 hour without phase separation of the hollow glass microspheres. In one exemplary embodiment, the filler material can be maintained in solution at a temperature of at least 110° C. for 24 hours without phase separation. Phase separation of the hollow glass microspheres can be determined using various methods. One exemplary method involves collecting the filler material in solution form and storing it in a container, such as a vial, at 110° C. After a specific amount of time, e.g., after 1 hour, 4 hours, 8 hours, 12 hours, etc., the vial is removed from the oven and the contents cooled at room temperature. The solidified filler material is then cut in half and the density of the top half is compared with the density of the bottom half. A difference in density of less than 0.01 density units between the top half and bottom half indicates no separation.

In one application, the inventive filler material is used in an electrical cable. An exemplary electrical cable contains 25 pairs of twisted metal (such as copper) wires. In one exemplary cable manufacturing process, the individual pairs of twisted wires are fed into a hopper containing the inventive filler material. As the pairs of twisted wire travels through the hopper, the filler material fills the interstitial space between the wires. At the output end of the hopper, the pairs of twisted wires are disposed closely to one another and a polymeric sheath is used to bundle the pairs of twisted wires together. At this point, the filler material not only occupies the interstitial space between the wires but also the interstitial space between the pairs of wires.

What is claimed is:

1. A filler material comprising:
   (a) from about 50 to 95 percent by weight mineral oil;
   (b) less than about 10 percent by weight block copolymer selected from the group consisting of styrene-ethylene/butylene, styrene-ethylene/propylene, styrene-butadiene-styrene, styrene-isoprene-styrene, styrene-ethylene/butylene-styrene, styrene-ethylene/propylene-styrene, and combinations thereof;
   (c) less than about 25 percent by weight petroleum wax;
   (d) less than about 20 percent by weight hollow glass microspheres; and
   (e) less than about 10 percent by weight thixotropic agent selected from the group consisting of clay, colloidal metal oxide, fumed metal oxide, and combinations thereof.

2. The filler material of claim 1, wherein the mineral oil is a paraffinic mineral oil or a naphthenic mineral oil.

3. The filler material of claim 2, wherein the paraffinic mineral oil or a naphthenic mineral oil has less than about 15% aromatic content.

4. The filler material of claim 1, wherein the petroleum wax has a melting point of greater than about 90° C.

5. The filler material of claim 1, wherein the petroleum wax is a polyethylene wax having a melting point greater than about 90° C.

6. The filler material of claim 1, wherein the petroleum wax is a synthetic wax having a melting point greater than about 90° C.

7. The filler material of claim 1, wherein the hollow glass microsphere has a particle size of about 10 to 140 micrometers.

8. The filler material of claim 1, wherein the hollow glass microsphere has a true density of about 0.1 to 0.4 g/cm$^3$.

9. The filler material of claim 1 where the fumed metal oxide is surface modified fumed silica.

10. The filler material of claim 9, wherein the surface modified fumed silica has substantially hydrophobic surface.

11. The filler material of claim 1 having a viscosity of less than about 0.2 Pa·s at 110° C. and shear rate of 40 sec$^{-1}$ as measured according to ASTM D-3236.

12. The filler material of claim 1 having a dielectric constant of less than or equal to 2.0 at 1 megahertz as measured according to ASTM D-150.

13. The filler material of claim 1 having a melt drop temperature greater than 90° C. as measured according to ASTM D-127.

14. The filler material of claim 1 having a dissipation factor at 1 megahertz of less than 0.001 as measured according to ASTM D-150.

15. The filler material of claim 1 having a volume resistivity at 500 volts of greater than $10^{13}$ ohm-cm as measured according to ASTM D-257.

16. The filler material of claim 1 has a minimum viscosity, as described by the Power Law Fluid parameters, where the "n" value is 0.8 and the "k" value is 0.25Pa·s.

17. The filler material of claim 1 has a maximum viscosity, as described by the Power Law Fluid parameters, where the "n" value is 0.2 and the "k" value is 7.0 Pa·s.

18. An electrical cable comprising the filler material of claim 1.

19. A filler material comprising:
   (a) from about 70.0 to 75.0 percent by weight mineral oil;
   (b) about 2.5 percent by weight styrene-ethylene/butylene-styrene block copolymer;
   (c) about 10.0 percent by weight petroleum wax;
   (d) from about 5.0 to 13.0 percent by weight hollow glass micro sphere;
   (e) about 3.0 percent by weight surface modified fumed silica; and
   (f) about 0.2 percent by weight antioxidant or stabilizer.

20. The filler material of claim 19, wherein the hollow glass microsphere has a true density of about 0.125 to 0.220 g/cm$^3$.

21. The filler material of claim 19, wherein the hollow glass micro sphere has a particle size of 65 to 120 micrometers.

22. The filler material of claim 19, wherein the antioxidant or stabilizer is selected from the group consisting of phenols, phosphites, phosphorites, thiosynergists, amines, benzoates, and combinations thereof.

23. An electrical cable comprising the filler material of claim 19.

* * * * *

UNITED STATES PATENT AND TRADEMARK OFFICE
CERTIFICATE OF CORRECTION

PATENT NO. : 7,247,796 B2
APPLICATION NO. : 11/015047
DATED : July 24, 2007
INVENTOR(S) : Nathan K. Hagen It is certified that error appears in the above-identified patent and that said Letters Patent is hereby corrected as shown below:

Title page,
Item [56], References Cited, OTHER PUBLICATIONS, delete "Encylopedia" and insert --Encyclopedia-- therefor.

Column 1,
Lines 55-56, delete "styrene-ethylene/ butylene," and insert --styrene-ethylene/butylene,-- therefor.

Column 5,
Line 45, delete "thixotropoic" and insert --thixotropic-- therefor.

Column 6,
Lines 47-48, delete "(octamethylcylotetrasiloxane" and insert --(octamethylcyclotetrasiloxane-- therefor.

Column 8,
Line 6, delete "paraffmic" and insert --paraffinic-- therefor.

Column 8,
Line 7, delete "paraffmic" and insert --paraffinic-- therefor.

Column 8,
Line 57, delete "micro sphere;" and insert --microsphere;-- therefor.

Signed and Sealed this

Fourth Day of September, 2007

JON W. DUDAS
*Director of the United States Patent and Trademark Office*